United States Patent
Irie et al.

(10) Patent No.: US 8,666,662 B2
(45) Date of Patent: Mar. 4, 2014

(54) NAVIGATION DEVICE

(75) Inventors: Takashi Irie, Tokyo (JP); Kumi Nishibashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 404 days.

(21) Appl. No.: 12/995,908

(22) PCT Filed: May 13, 2009

(86) PCT No.: PCT/JP2009/002079
§ 371 (c)(1),
(2), (4) Date: Dec. 2, 2010

(87) PCT Pub. No.: WO2009/150784
PCT Pub. Date: Dec. 17, 2009

(65) Prior Publication Data
US 2011/0098919 A1    Apr. 28, 2011

(30) Foreign Application Priority Data
Jun. 11, 2008  (JP) .................................. 2008-153091

(51) Int. Cl.
*G01C 21/34*  (2006.01)

(52) U.S. Cl.
USPC ........... 701/533; 701/400; 701/408; 701/410; 701/468; 340/995.1; 340/995.25

(58) Field of Classification Search
None
See application file for complete search history.

(56) References Cited

U.S. PATENT DOCUMENTS

| 7,194,356 B2 * | 3/2007 | Sano ............................ 701/428 |
| 7,433,780 B2 * | 10/2008 | Machino ...................... 701/533 |
| 7,979,201 B2 * | 7/2011 | Machino ...................... 701/413 |
| 8,024,115 B2 * | 9/2011 | Hayashida et al. ........... 701/414 |
| 8,190,358 B2 * | 5/2012 | Machino ...................... 701/408 |
| 2001/0021895 A1 * | 9/2001 | Yamazaki ..................... 701/211 |
| 2003/0074131 A1 | 4/2003 | Barkowski et al. |
| 2005/0055158 A1 * | 3/2005 | Machino ...................... 701/209 |
| 2006/0253249 A1 * | 11/2006 | Bruelle-Drews ............. 701/209 |
| 2009/0326804 A1 * | 12/2009 | Machino ...................... 701/201 |
| 2010/0063720 A1 * | 3/2010 | Machino ...................... 701/201 |

(Continued)

FOREIGN PATENT DOCUMENTS

| DE | 10146744 A1 | 4/2003 |
| DE | 102004032194 A1 | 4/2005 |

(Continued)

*Primary Examiner* — Thomas Tarcza
*Assistant Examiner* — Richard Goldman
(74) *Attorney, Agent, or Firm* — Birch, Stewart, Kolasch & Birch, LLP (57) ABSTRACT

A navigation device includes an HOV lane entrance/exit section determining unit for, when HOV lane position information defining the position of an HOV lane and lane information defining lanes are included in link data included in map data acquired by a map data processing unit, determining whether or not the vehicle can make a lane change between the HOV lane and either a right-hand side lane to the right of the HOV lane or a left-hand side lane to the left of the HOV lane on the basis of the lane information, and determining that there is an HOV lane entrance/exit section when the vehicle can make a lane change between the HOV lane and either the right-hand side lane or the left-hand side lane, and an HOV lane entrance/exit section storage unit for storing HOV lane entrance/exit section information showing the HOV lane entrance/exit section.

10 Claims, 7 Drawing Sheets

(56) References Cited

U.S. PATENT DOCUMENTS

| | | |
|---|---|---|
| 2010/0070164 A1* | 3/2010 | Machino .................. 701/201 |
| 2010/0094538 A1* | 4/2010 | Machino .................. 701/201 |
| 2010/0274473 A1* | 10/2010 | Konishi .................. 701/200 |
| 2011/0022302 A1* | 1/2011 | Machino .................. 701/201 |
| 2011/0098919 A1* | 4/2011 | Irie et al. .................. 701/201 |
| 2011/0106420 A1* | 5/2011 | Nishibashi et al. .......... 701/200 |
| 2011/0153200 A1* | 6/2011 | Tsuji et al. .................. 701/201 |
| 2011/0238298 A1* | 9/2011 | Machino .................. 701/201 |
| 2011/0288760 A1* | 11/2011 | Nishibashi et al. .......... 701/200 |
| 2011/0288761 A1* | 11/2011 | Nishibashi et al. .......... 701/200 |
| 2011/0288767 A1* | 11/2011 | Nishibashi et al. .......... 701/201 |

FOREIGN PATENT DOCUMENTS

| | | |
|---|---|---|
| EP | 1498694 A2 | 1/2005 |
| JP | 7-192193 A | 7/1995 |
| JP | 2001-183159 A | 7/2001 |
| JP | 3908425 B2 | 4/2007 |
| JP | 2007-127598 A | 5/2007 |

* cited by examiner

+ [The Leftmost Lane Is an HOV Lane] → The Vehicle Cannot Make a Lane Change between the HOV Lane and the General Lane in This Road (b)

+ [The Leftmost Lane Is an HOV Lane] → The Vehicle Can Make a Lane Change between the HOV Lane and the General Lane in This Road

HOV Lane Entrance/Exit Section

NAVIGATION DEVICE

FIELD OF THE INVENTION

The present invention relates to a navigation device that guides a user to his or her destination. More particularly, it relates to a technology of recognizing entrance/exit sections of an HOV lane (High Occupancy Vehicle Lane) in order to carry out a route search, route guidance, etc. by using the HOV lane.

BACKGROUND OF THE INVENTION

A conventional vehicle-mounted navigation device displays the current position of a vehicle on a digital map (simply referred to as a "map" from here on) displayed on a display unit while superimposing the current position on the map. Furthermore, the conventional vehicle-mounted navigation device searches for a route leading from the current position of the vehicle to a destination, and displays the recommended route on the map. In addition, the conventional vehicle-mounted navigation device carries out route guidance of the recommended route on the basis of map information read from a recording medium.

By the way, a car pool lane (Car Pool Lane) or the like which is used in a road system mainly seen in, for example, a North American big city is known as a road on which restrictions showing which vehicles can enter the road are imposed. A car pool lane is also called an HOV lane and is a lane along which only vehicles with two or more people are allowed to travel. A special lane disposed along with lanes on a freeway, a lane which is a shortcut of an interchange, etc. are known as car pool lanes. A road system which adopts such a car pool lane provides users with a preferential treatment that makes it possible to arrive at the destination in a shorter time as long as they travel along a carpool lane so as to prod users to share a vehicle with one or more persons, thereby reducing the traffic as a whole and therefore reducing traffic congestions.

As a technology related to such a car pool lane, patent reference 1 discloses a navigation device that enables a vehicle to efficiently travel along a lane on which restrictions showing which vehicles can enter the lane from another lane and exit the lane into another lane are imposed. This navigation device reads map data including road information about entering and exiting points in each highway equipped with a car pool lane from a DVD, and stores the map data in a data buffer. A route search processing unit performs a route searching process in consideration of whether or not car pool lanes can be used by using the map data stored in the data buffer. When performing a route guidance using carpool lanes, a carpool lane guidance unit performs a predetermined lane change guidance using an image and voice at a time when each of the entering and exiting points at which the vehicle should change its travelling direction gets close to a point at a predetermined distance or less from the position of the vehicle.

RELATED ART DOCUMENT

Patent Reference

[Patent reference 1] JP,2001-183159,A

However, according to the conventional technology disclosed by above-mentioned patent reference 1, an HOV lane and a general lane are expressed as different links, and each entrance/exit of an HOV lane is expressed as a link connecting a link expressing an HOV lane and a link expressing a general lane. A problem is therefore that in a case in which both an HOV lane and a general lane are included in a link, each entrance/exit section of the HOV lane cannot be identified.

The present invention is made in order to solve the above-mentioned problem, and it is therefore an object of the present invention to provide a navigation device that can identify each entrance/exit section of an HOV lane even in a case in where both the HOV lane and a general lane are included in one link.

SUMMARY OF THE INVENTION

In order to solve the above-mentioned problem, in accordance with the present invention, there is provided a navigation device including: a map data processing unit for acquiring map data from a map data storage unit; an HOV lane entrance/exit section determining unit for, when HOV lane position information defining a position of an HOV lane and lane information defining lanes are included in link data included in the map data acquired by the map data processing unit, determining whether or not a vehicle can make a lane change between the HOV lane and either a right-hand side lane to right of the HOV lane shown by the HOV lane position information or a left-hand side lane to left of the HOV lane on a basis of the lane information, and determining that there is an HOV lane entrance/exit section when determining that the vehicle can make a lane change between the HOV lane and either the right-hand side lane or the left-hand side lane; and an HOV lane entrance/exit section storage unit for storing HOV lane entrance/exit section information showing the HOV lane entrance/exit section determined by the HOV lane entrance/exit section determining unit.

Because even in a case in which both an HOV lane and a general lane of a road are included in one link, the navigation device in accordance with the present invention can identify each entrance/exit section of the HOV lane, the navigation device enables the user to identify each lane change enable section in which the vehicle can make a lane change between the HOV lane and the general lane.

EMBODIMENTS OF THE INVENTION

Hereafter, in order to explain this invention in greater detail, the preferred embodiments of the present invention will be described with reference to the accompanying drawings.

Embodiment 1

Figure 1:
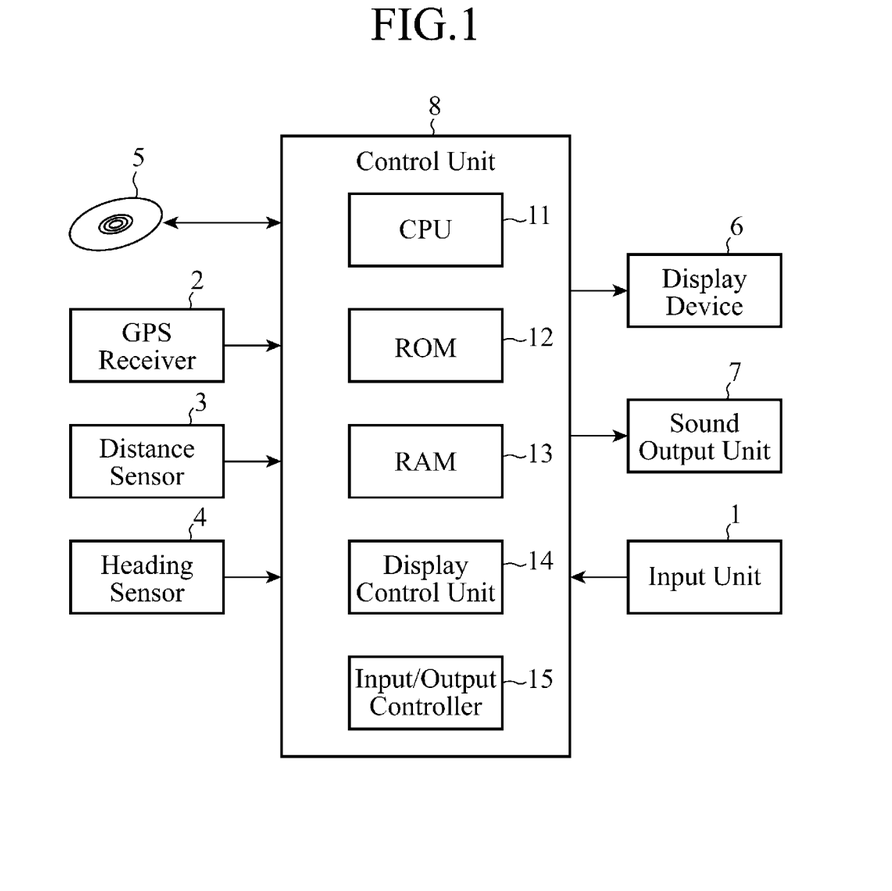
FIG. 1 is a block diagram showing the hardware configuration of a navigation device in accordance with Embodiment 1 of the present invention.

FIG. 1 is a block diagram showing the hardware configuration of a navigation device in accordance with Embodiment 1 of the present invention. This navigation device is provided with an input unit 1, a GPS (Global Positioning System) receiver 2, a distance sensor 3, a heading sensor 4, a map data storage unit 5, a display unit 6, a sound output unit 7, and a control unit 8.

The input unit 1 is comprised of, for example, a touch panel placed on the screen of the display unit 6. This input unit 1 is used in order for a user to set a place of departure, a destination, a waypoint, or the like for a route search, or to provide one of various commands to the navigation device, for example. Information inputted from this input unit 1 is sent to the control unit 8 as an operation signal.

The GPS receiver 2 detects the current position of a vehicle on the basis of GPS signals received from GPS satellites. The current position of the vehicle detected by this GPS receiver 2 is informed to the control unit 8 as a current position signal. The distance sensor 3 detects the travel distance of the vehicle. The travel distance detected by this distance sensor 3 is informed to the control unit 8 as a distance signal. The heading sensor 4 detects the heading toward which the vehicle is heading. The heading detected by this heading sensor 4 is informed to the control unit 8 as a heading signal.

The map data storage unit 5 is comprised of, for example, an HDD (Hard Disk Drive) device, and stores various types of data for implementing a navigation function as well as digitized map data, such as link data and node data which define roads. The map data storage unit 5 is not limited to the HDD device, and can be alternatively comprised of a drive device for reading data from a DVD (Digital Versatile Disk) or a CD (Compact Disc) mounted thereto.

In link data included in map data, lane information about the link shown by this link data, HOV lane position information, HOV lane existence or non-existence information, traffic division information, etc. are included. The lane information includes information for defining the color, the type, and so on of each lane. The HOV lane position information includes information showing which lane is an HOV lane. The HOV lane existence or non-existence information including information showing whether an HOV lane exists in the link. The traffic division information includes information showing whether the link is restricted to right-hand traffic or left-hand traffic. While the data stored in this map data storage unit 5 can be read by the control unit 8, data sent from the control unit 8 can be written in this map data storage unit 5.

The display unit 6 is comprised of, for example, an LCD (Liquid Crystal Display), and displays a map, a route, a vehicle position mark, a guide map, various guide messages, etc. on the screen thereof according to an image signal sent thereto from the control unit 8. The sound output unit 7 is comprised, for example, a speaker, and outputs guidance information and so on via voice according to a sound signal sent thereto from the control unit 8.

As will be mentioned below in detail, the control unit 8 controls the whole navigation device while performing a map display process, a route searching process, or a route guidance process. This control unit 8 is provided with a CPU (Central Processing Unit) 11, a ROM (Read Only Memory) 12, a RAM (Random Access Memory) 13, a display control unit 14, and an input/output controller 15.

The CPU 11 uses the RAM 13 as a work memory, and operates according to a program read from the ROM 12 to perform one of the various processes including the route search, the route guidance, and determination of entrance/exit sections of an HOV lane. The ROM 12 stores programs and data which the CPU 11 reads to perform the various processes. The RAM 13 is used as the work memory of the CPU 11, as mentioned above, and temporarily stores data being arithmetic-processed (e.g., expanded map data).

The display control unit 14 controls the display unit 6. Concretely, the display control unit 14 converts display data created by the CPU 11 into an image signal, and sends this image signal to the display unit 6 via the input/output controller 15. The input/output controller 15 functions as an interface between the control unit 8, and the input unit 1, the GPS receiver 2, the distance sensor 3, the heading sensor 4, the map data storage unit 5 and the display unit 6 which are connected to the control unit 8, and controls transmission and reception of signals among these components.

Figure 2:
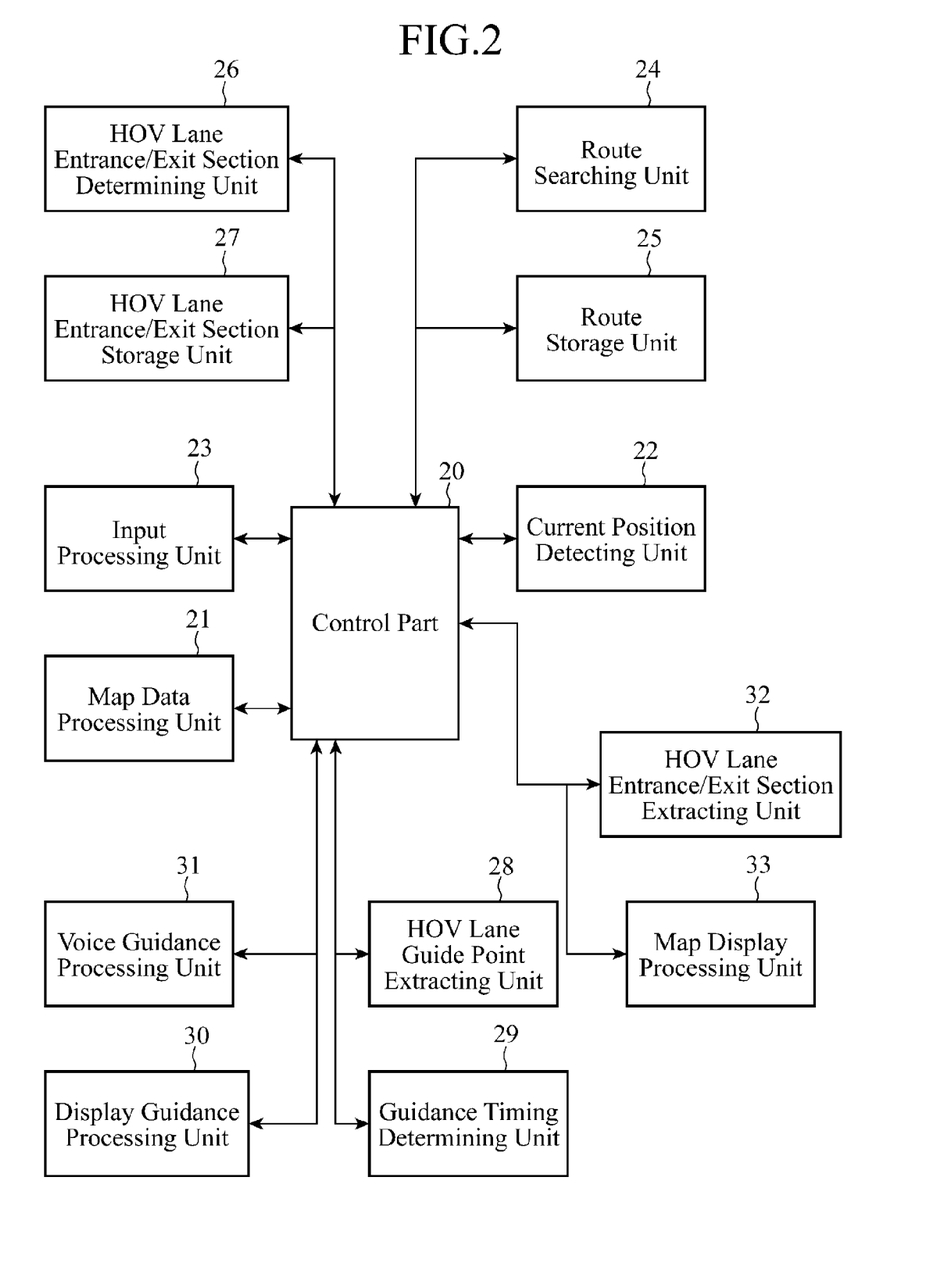
FIG. 2 is a functional block diagram showing the functional configuration of a control unit of the navigation device in accordance with Embodiment 1 of the present invention.

Next, the details of functions implemented by the control unit 8 will be explained. FIG. 2 is a functional block diagram showing the functional configuration of the control unit 8. The control unit 8 is provided with a control part 20, a map data processing unit 21, a current position detecting unit 22, an input processing unit 23, a route searching unit 24, a route storage unit 25, an HOV lane entrance/exit section determining unit 26, an HOV lane entrance/exit section storage unit 27, an HOV lane guide point extracting unit 28, a guidance timing determining unit 29, a display guidance processing unit 30, a voice guidance processing unit 31, an HOV lane entrance/exit extracting unit 32, and a map display processing unit 33. These components except the route storage unit 25 and the HOV lane entrance/exit section storage unit 27 are implemented through program execution by the CPU 11. The HOV lane guide point extracting unit 28, the guidance timing determining unit 29, the display guidance processing unit 30, and the voice guidance processing unit 31 correspond to a route guidance unit in accordance with the present invention.

The control part 20 controls the whole of the control unit 8. For example, the control part 20 controls start and stop of each of the components connected thereto, and transmission and reception of data among these components. The map data processing unit 21 acquires map data from the map data storage unit 5 and sends them to the control part 20, and also sends HOV lane entrance/exit section information (which will be mentioned below in detail) sent thereto from the control part 20 to the map data storage unit 5 and makes this map data storage unit 5 store the HOV lane entrance/exit section information as part of map data.

The current position detecting unit 22 detects the current position of the vehicle on the basis of both the current position signal sent thereto from the GPS receiver 2 or a current position signal which the current position detecting unit has created with dead reckoning by using the heading signal sent thereto from the heading sensor 4 and the distance signal sent thereto from the distance sensor 3, and the map data acquired from the map data processing unit 21 via the control part 20. The current position of the vehicle detected by this current position detecting unit 22 is informed to the control part 20 as current position data.

The input processing unit 23 analyzes the operation signal sent thereto from the input unit 1, and sends data showing the place of departure, the destination, or the waypoint which the input processing unit has acquired through this analysis to the control part 20.

The route searching unit 24 searches for a route leading from the current position (the place of departure) shown by the current position data sent thereto, via the control part 20, from the current position detecting unit 22 to the destination shown by the data showing the destination sent thereto, via the control part 20, from the input processing unit 23 on the basis of the map data acquired from the map data acquiring unit 21 via the control part 20. The route which this route searching unit 24 has searched for is informed to the route storage unit 25 as route data.

The route storage unit 25 is disposed in, for example, apart of the RAM 13 of the control unit 8, and stores the route data sent thereto from the route searching unit 24. The route data stored in this route storage unit 25 can be read by the control part 20.

The HOV lane entrance/exit section determining unit 26 checks to see whether or not lane information and HOV lane position information are included in link data included in the map data acquired from the map data processing unit 21 via the control part 20, and, when lane information and HOV lane position information are included in the link data, determines whether or not the vehicle can make a lane change between the HOV lane and each of a right-hand side lane to the right of the HOV lane and a left-hand side lane to the left of the HOV lane which are shown by the HOV lane position information on the basis of the lane information. Then, when determining that the vehicle can make a lane change between the HOV lane and either of the right-hand side and left-hand side lanes, the HOV lane entrance/exit section determining unit determines with the link includes an HOV lane entrance/exit section, and sends HOV lane entrance/exit section information showing that the link includes an HOV lane entrance/exit section to the HOV lane entrance/exit section storage unit 27.

The HOV lane entrance/exit section storage unit 27 stores the HOV lane entrance/exit section information sent thereto from the HOV lane entrance/exit section determining unit 26 therein. The HOV lane entrance/exit section information stored in the HOV lane entrance/exit section storage unit 27 can be read by the control part 20.

The HOV lane guide point extracting unit 28 extracts HOV lane entrance/exit sections on the basis of the route data read from the route storage unit 25 via the control part 20, and HOV lane entrance/exit section information read from the HOV lane entrance/exit section storage unit 27 via the control part 20, and further extracts HOV lane entrance/exit sections existing at a predetermined distance or less ahead of the vehicle from among the HOV lane entrance/exit sections extracted above.

The guidance timing determining unit 29 determines whether or not the distance between the vehicle position shown by the vehicle position data acquired from the current position detecting unit 22 via the control part 20 and each of the HOV lane entrance/exit sections extracted by the HOV lane guide point extracting unit 28 is equal to or shorter than a predetermined distance, and, when the distance between the vehicle position and each of the HOV lane entrance/exit sections is equal to or shorter than the predetermined distance, starts the display guidance processing unit 30 and the voice guidance processing unit 31.

When started by the guidance timing determining unit 29, the display guidance processing unit 30 creates display data showing a guide map. The display data created by this display guidance processing unit 30 is converted into an image signal by the display control unit 14, and this image signal is sent to the display unit 6 via the input/output controller 15. As a result, the guide map is displayed on the screen of the display unit 6.

When started by the guidance timing determining unit 29, the voice guidance processing unit 31 creates sound data showing voice guidance. The sound data created by this voice guidance processing unit 31 is converted into a sound signal, and this sound signal is sent to the sound output unit 7 via the input/output controller 15. As a result, the voice guidance is outputted from the sound output unit 7.

The HOV lane entrance/exit extracting unit 32 extracts the HOV lane entrance/exit sections determined by the HOV lane entrance/exit section determining unit 26, i.e., the enter sections in each of which vehicles are allowed to enter the HOV lane from lanes other than the HOV lane, and the exit sections in each of which vehicles are allowed to exit the HOV lane into a lane other than the HOV lane, and creates entrance/exit section position data showing the positions of these extracted entrance/exit sections of the HOV lane and sends the entrance/exit section position data to the control part 20.

The map display processing unit 33 creates display data for displaying the map based on the map data acquired from the map data processing unit 21 via the control part 20, the route based on the route data acquired from the route storage unit 25 via the control part 20, and the entrance/exit sections of the HOV lane extracted by the HOV lane entrance/exit extracting unit 32, and so on. The display data created by this map display processing unit 33 is converted into an image signal by the display control unit 14, and this image signal is sent to the display unit 6 via the input/output controller 15.

Figure 3:
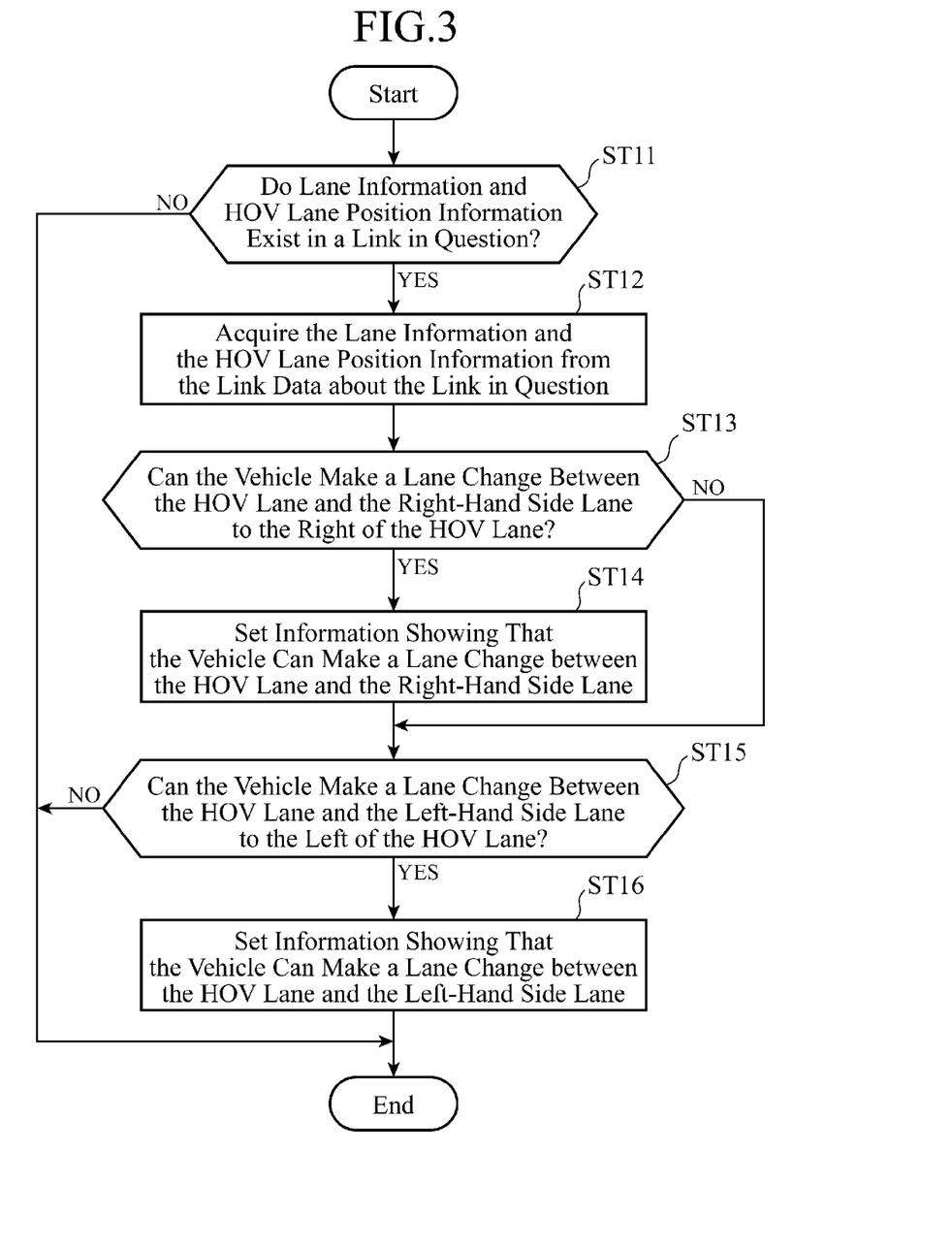
FIG. 3 is a flow chart showing the operation of the navigation device in accordance with Embodiment 1 of the present invention, focusing on an HOV lane entrance/exit section identification process.

Next, the operation of the navigation device in accordance with Embodiment 1 of the present invention constructed as mentioned above will be explained with reference to a flow chart shown in FIG. 3, focusing on a process of identifying each entrance/exit section of an HOV lane (referred to as an "HOV lane entrance/exit section identifying process" from here on). In this HOV lane entrance/exit section identifying process, entrance/exit sections of an HOV lane are identified as to an arbitrary link by using a combination of lane information and HOV lane position information. Hereafter, the HOV lane entrance/exit section identifying process will be explained concretely.

In the HOV lane entrance/exit section identifying process, whether lane information and HOV lane position information exist in a link in question is checked to see first (step ST11). More specifically, the HOV lane entrance/exit section determining unit 26 checks to see whether lane information and HOV lane position information exist in link data corresponding to the link in question by referring to the contents of the map data storage unit 5 via the control part 20 and the map data processing unit 21. When, in this step ST11, determining that lane information and HOV lane position information do not exist in the link in question, the HOV lane entrance/exit section determining unit recognizes that no HOV lane entrance/exit section exists in the link and ends the HOV lane entrance/exit section identifying process.

In contrast, when it is determined in step ST11 that lane information and HOV lane position information exist in the link in question, the lane information and the HOV lane position information are acquired from the link data about the link in question (step ST12). More specifically, the map data processing unit 21 acquires map data corresponding to a map to be displayed on the screen of the display unit 6 from the map data storage unit 5. Then, the HOV lane entrance/exit section determining unit 26 acquires the map data from the map data processing unit 21 via the control part 20, and acquires the lane information and the HOV lane position information from the link data included in this map data.

Whether or not the vehicle can make a lane change between the HOV lane and the right-hand side lane to the right of the HOV lane is then checked to see (step ST13). More specifically, the HOV lane entrance/exit section determining unit 26 checks to see whether or not the vehicle can make a lane change between the HOV lane and the right-hand side lane to the right of the HOV lane shown by the HOV lane position information acquired in step ST12 on the basis of the lane information acquired in step ST12.

When it is determined in this step ST13 that the vehicle can make a lane change between the HOV lane and the right-hand side lane to the right of the HOV lane, information showing that the vehicle can make a lane change between the HOV lane and the right-hand side lane to the right of the HOV lane is set (step ST14). More specifically, the HOV lane entrance/exit section determining unit 26 stores HOV lane entrance/exit section information showing that the vehicle can make a lane change between the HOV lane and the right-hand side lane to the right of the HOV lane of the link in question, and this link includes an HOV lane entrance/exit section in the HOV lane entrance/exit section storage unit 27. In contrast, when it is determined in step ST13 that the vehicle cannot make a lane change between the HOV lane and the right-hand side lane to the right of the HOV lane, the process of step ST14 is skipped.

Whether or not the vehicle can make a lane change between the HOV lane and the left-hand side lane to the left of the HOV lane is then checked to see (step ST15). More specifically, the HOV lane entrance/exit section determining unit 26 checks to see whether or not the vehicle can make a lane change between the HOV lane and the left-hand side lane to the left of the HOV lane shown by the HOV lane position information acquired in step ST12 on the basis of the lane information acquired in step ST12.

When it is determined in this step ST15 that the vehicle can make a lane change between the HOV lane and the left-hand side lane to the left of the HOV lane, information showing that the vehicle can make a lane change between the HOV lane and the left-hand side lane to the left of the HOV lane is set (step ST16). More specifically, the HOV lane entrance/exit section determining unit 26 stores HOV lane entrance/exit section information showing that the vehicle can make a lane change between the HOV lane and the left-hand side lane to the left of the HOV lane of the link in question, and this link includes an HOV lane entrance/exit section in the HOV lane entrance/exit section storage unit 27. Then, the HOV lane entrance/exit section identifying process is ended. In contrast, when it is determined in step ST15 that the vehicle cannot make a lane change between the HOV lane and the left-hand side lane to the left of the HOV lane, the HOV lane entrance/exit section identifying process is ended.

Figure 4:
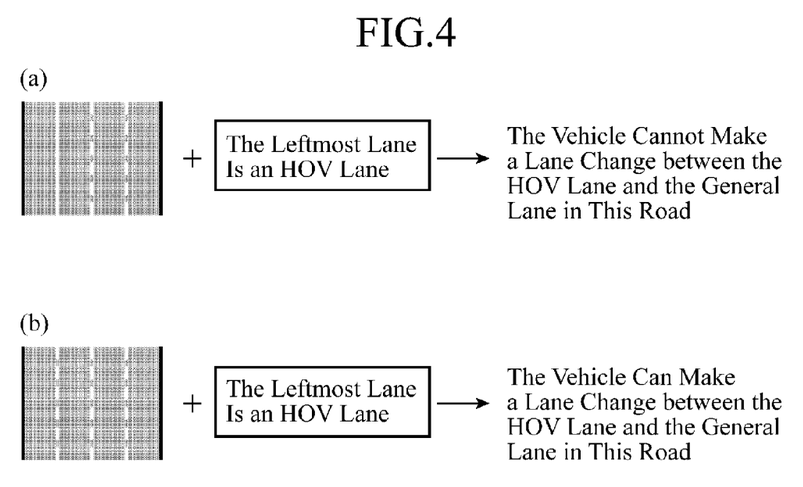
FIG. 4 is a view for explaining the operation of the navigation device in accordance with Embodiment 1 of the present invention.

Through the above-mentioned HOV lane entrance/exit section identifying process, when the HOV lane position information shows that "the leftmost lane is an HOV lane" and the lane information shows that "the lane line between the HOV lane and the right-hand side lane (a general lane) to the right of the HOV lane is a continuous yellow line", as shown in, for example, FIG. 4(a), it is determined that the vehicle cannot make a lane change from and to the HOV lane.

Furthermore, when the HOV lane position information shows that "the leftmost lane is an HOV lane" and the lane information shows that "the lane line between the HOV lane and the right-hand side lane (a general lane) to the right of the HOV lane is a dotted white line", as shown in FIG. 4(b), it is determined that the vehicle can make a lane change between the HOV lane and the right-hand side lane.

Figure 5:
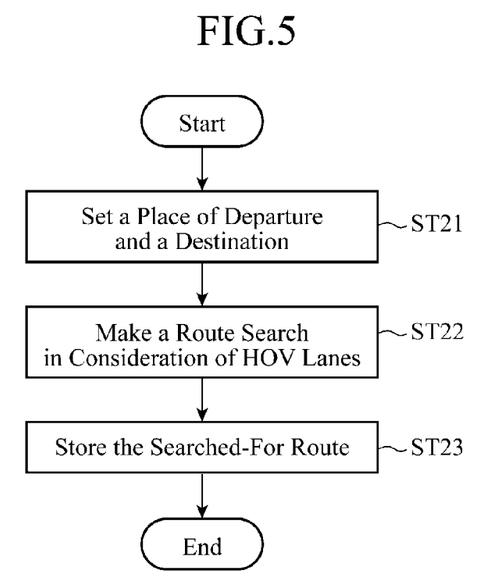
FIG. 5 is a flow chart showing a route searching process carried out by the navigation device in accordance with Embodiment 1 of the present invention.

Next, the route searching process carried out by the navigation device in accordance with this Embodiment 1 will be explained with reference to a flow chart shown in FIG. 5. In this route searching process, the HOV lane entrance/exit section information stored in the HOV lane entrance/exit section storage unit 27 through the above-mentioned HOV lane entrance/exit section identifying process is referred to.

In the route searching process, a setting of a place of departure and a destination is made first (step ST21). More specifically, the user operates the input unit 1 so as to input his or her destination. An operation signal generated through the user's operation on this input unit 1 is sent to the input processing unit 23. The input processing unit 23 analyzes the operation signal sent thereto from the input unit 1, and sends data showing the destination acquired through this analysis to the route searching unit 24 via the control part 20. Furthermore, the current position detecting unit 22 detects the current position of the vehicle on the basis of either the current position signal sent thereto from the GPS receiver 2 or a current position signal which the current position detecting unit has created with dead reckoning by using the heading signal sent thereto from the heading sensor 4 and the distance signal sent thereto from the distance sensor 3, and the map data acquired from the map data processing unit 21 via the control part 20, and informs the current position of the vehicle to the control part 20 as current position data.

A route search in consideration of HOV lanes is then carried out (step ST22). It is assumed that in advance of the process of this step ST22, the HOV lane entrance/exit section identifying process shown in the flow chart of FIG. 3 is carried out and the HOV lane entrance/exit section information is stored in the HOV lane entrance/exit section storage unit 27. The route searching unit 24 searches for a route leading from the current position (the place of departure) shown by the current position data sent thereto, via the control part 20, from the current position detecting unit 22 to the destination shown by the data showing the destination which is sent thereto, via the control part 20, from the input processing unit 23 on the basis of the map data acquired from the map data processing unit 21 via the control part 20 and the HOV lane entrance/exit section information read from the HOV lane entrance/exit section storage unit 27 via the control part 20.

The searched-for route is then stored (step ST23). More specifically, the route searching unit 24 informs the route which is searched for in step ST22 to the route storage unit 25 as route data so as to make this route storage unit 25 store the route data. The route searching process is then ended.

Figure 6:
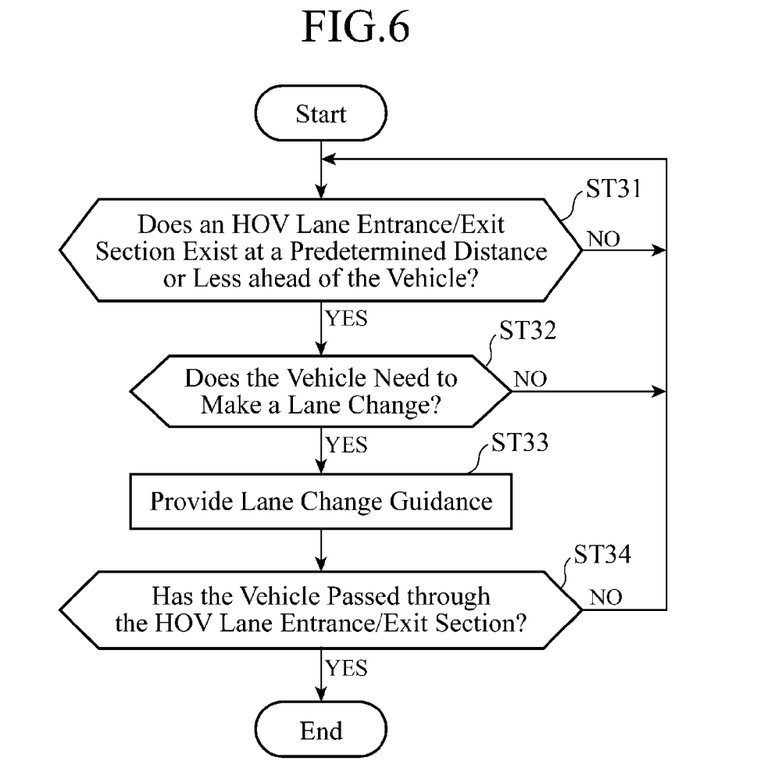
FIG. 6 is a flow chart showing a process of providing lane change guidance about an HOV lane entrance/exit section which is carried out by the navigation device in accordance with Embodiment 1 of the present invention.

Next, a process of providing lane change guidance about an HOV lane entrance/exit section which is carried out by the navigation device in accordance with Embodiment 1 of the present invention will be explained with reference to a flow chart shown in FIG. 6. In this lane change guidance process, the HOV lane entrance/exit section information stored in the HOV lane entrance/exit section storage unit 27 through the above-mentioned HOV lane entrance/exit section identifying process is referred to.

In the lane change guidance process, whether an HOV lane entrance/exit section exists at a predetermined distance or less ahead of the vehicle is checked to see first (step ST31). It is assumed that in advance of the process of this step ST31, the above-mentioned HOV lane entrance/exit section identifying process and the route searching process have been carried and ended. The HOV lane guide point extracting unit 28 extracts the HOV lane entrance/exit sections on the basis of the route data read from the route storage unit 25 via the control part 20 and the HOV lane entrance/exit section information read from the HOV lane entrance/exit section storage unit 27 via the control part 20, and then checks to see whether an HOV lane entrance/exit section exists at the predetermined distance or less ahead of the vehicle, the HOV lane entrance/exit section being included in the extracted HOV lane entrance/exit sections. When, in this step ST31, determining that no HOV lane entrance/exit section exists at the predetermined distance or less ahead of the vehicle, the HOV lane guide point extracting unit enters await state in which it repeatedly carries out this step ST31.

When it is determined in the wait state in which this step ST31 is repeatedly carried out that an HOV lane entrance/exit section exists at the predetermined distance or less ahead of the vehicle, whether the vehicle needs to make a lane change is checked to see (step ST32). More specifically, the HOV lane guide point extracting unit 28 checks to see whether or not the vehicle needs to make a lane change in the HOV lane entrance/exit section which has been determined to exist at the predetermined distance or less ahead of the vehicle in step ST31. When, in this step ST32, determining that the vehicle does not have to make a lane change, the HOV lane guide point extracting unit returns the sequence to step ST31 and repeats the above-mentioned processes.

Figure 7:
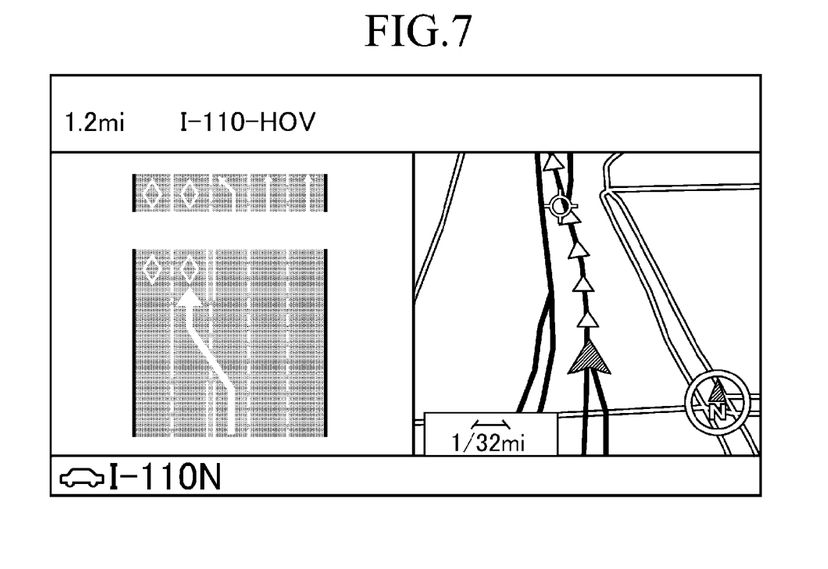
FIG. 7 is a view showing an example of a guide map displayed by the navigation device in accordance with Embodiment 1 of the present invention.

When it is determined in above-mentioned step ST32 that the vehicle needs to make a lane change, lane change guidance is then provided (step ST33). More specifically, the guidance timing determining unit 29 determines whether or not the distance between the vehicle position shown by the vehicle position data acquired from the current position detecting unit 22 via the control part 20, and an HOV lane entrance/exit section extracted by the HOV lane guide point extracting unit 28 becomes equal to or shorter than the predetermined distance, and, when the distance becomes equal to or shorter than the predetermined distance, starts the display guidance processing unit 30 and the voice guidance processing unit 31. When started by the guidance timing determining unit 29, the display guidance processing unit 30 creates display data showing a guide map. The display data created by this display guidance processing unit 30 is converted into an image signal by the display control unit 14, and this image signal is sent to the display unit 6 via the input/output controller 15. As a result, the guide map as shown in, for example, FIG. 7 is displayed on the screen of the display unit 6. Furthermore, when started by the guidance timing determining unit 29, the voice guidance processing unit 31 creates sound data showing voice guidance. The sound data created by this voice guidance processing unit 31 is converted into a sound signal, and this sound signal is sent to the sound output unit 7 via the input/output controller 15. As a result, voice guidance, e.g., "Keep left into the HOV lane" is outputted from the sound output unit 7.

Whether the vehicle has passed through the HOV lane entrance/exit section is then checked to see (step ST34). More specifically, the guidance timing determining unit 29 determines whether the vehicle position shown by the vehicle position data acquired from the current position detecting unit 22 via the control part 20 has passed through the HOV lane entrance/exit section extracted by the HOV lane guide point extracting unit 28. When, in this step ST34, determining that the vehicle position has not passed through the HOV lane entrance/exit section yet, the guidance timing determining unit returns the sequence to step ST31 and repeats the above-mentioned processes. In contrast, when, in step ST34, determining that the vehicle position has passed through the HOV lane entrance/exit section, the guidance timing determining unit ends the lane change guidance process.

Figure 8:
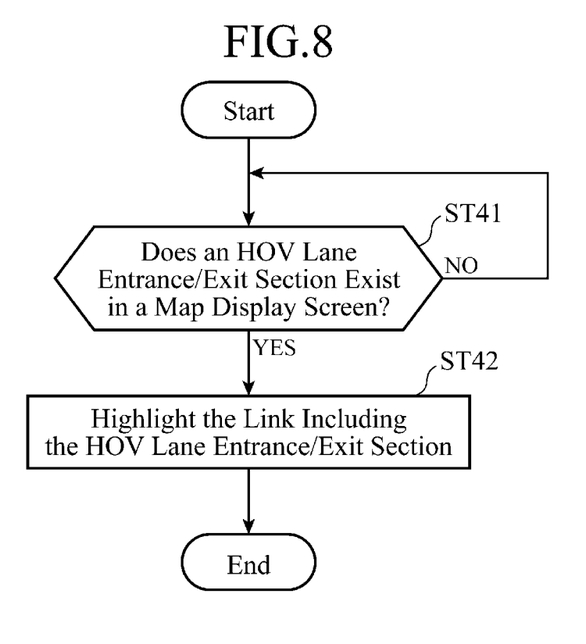
FIG. 8 is a flow chart showing a map display process of displaying an HOV lane entrance/exit section on a map which is carried out by the navigation device in accordance with Embodiment 1 of the present invention.

Next, a map display process of displaying an HOV lane entrance/exit section on a map which is carried out by the navigation device in accordance with Embodiment 1 of the present invention will be explained with reference to a flowchart shown in FIG. 8. In this map display process, the HOV lane entrance/exit section information stored in the HOV lane entrance/exit section storage unit 27 through the above-mentioned HOV lane entrance/exit section identifying process is referred to.

In the map display process, whether an HOV lane entrance/exit section exists in a map display screen is checked to see first (step ST41). It is assumed that in advance of the process of this step ST41, the HOV lane entrance/exit section identifying process and the route searching process have been carried out and ended. The HOV lane entrance/exit extracting unit 32 checks to see whether an HOV lane entrance/exit section exists in the map display screen currently being displayed. When, in this step ST41, determining that no HOV lane entrance/exit section exists in the map display screen, HOV lane entrance/exit extracting unit enters a wait state in which it repeatedly carries out this step ST41.

Figure 9:
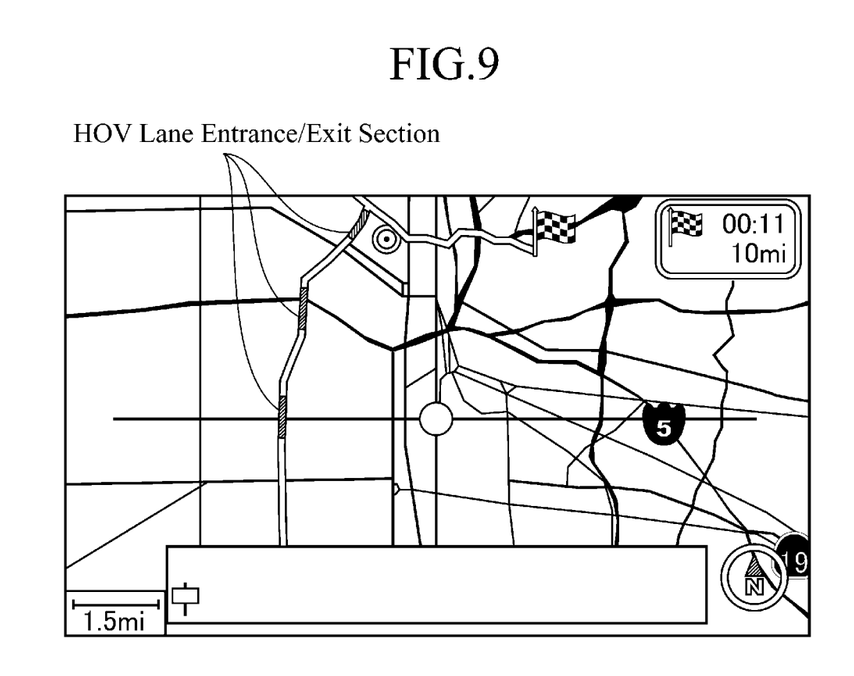
FIG. 9 is a view showing an example of the map displayed by the navigation device in accordance with Embodiment 1 of the present invention.

When it is determined in the wait state in which this step ST41 is repeatedly carried out that an HOV lane entrance/exit section exists in the map display screen, the link including the HOV lane entrance/exit is highlighted (step ST42). More specifically, the map display processing unit 33 highlights the link including the HOV lane entrance/exit section which has been determined to exist in step ST41. As a result, a map in which the link including the HOV lane entrance/exit section is highlighted in a color different from those in which the other portions are displayed, as shown in, for example, in FIG. 9, is displayed on the screen of the display unit 6.

As previously explained, because even in a case in which both an HOV lane and a general lane of a road are included in one link, the navigation device in accordance with Embodiment 1 of the present invention can identify each entrance/exit section of the HOV lane, the navigation device enables the user to identify each lane change enable section in which the vehicle can make a lane change between the HOV lane and the general lane.

Furthermore, by using HOV lane entrance/exit section information showing an entrance/exit section in which vehicles are enabled to enter and exit an HOV lane from and into a general lane, the navigation device in accordance with Embodiment 1 of the present invention can provide a route search using HOV lanes appropriately, and guidance about entrance and exit to and from an HOV lane. In addition, the navigation device in accordance with Embodiment 1 of the present invention enables the user to identify at which point an entrance/exit section of an HOV lane is located in advance by also displaying the entrance/exit section in a map displayed on the screen thereof.

Embodiment 2

A navigation device in accordance with Embodiment 2 of the present invention has the same configuration as that of the navigation device in accordance with Embodiment 1 shown in FIGS. 1 and 2, except for the function of an HOV lane entrance/exit section determining unit 26.

The HOV lane entrance/exit section determining unit 26 checks to see whether lane information, HOV lane existence or non-existence information, and traffic division information are included in link data included in map data acquired from a map data processing unit 21 via a control part 20, and, when the HOV lane existence or non-existence information shows existence of an HOV lane, determines whether the vehicle can make a lane change between the HOV lane and each of a right-hand side lane to the right of the leftmost lane, and a left-hand side lane to the left of the rightmost lane according to right-hand traffic or left-hand traffic regulation shown by the traffic division information on the basis of the lane information. When then determining that the vehicle can make a lane change between the HOV lane and either of the right-hand side lane to the right of the leftmost lane, and the left-hand side lane to the left of the rightmost lane, the HOV lane entrance/exit section determining unit sends HOV lane entrance/exit section information showing that the vehicle can make such the lane change to an HOV lane entrance/exit section storage unit 27.

Figure 10:
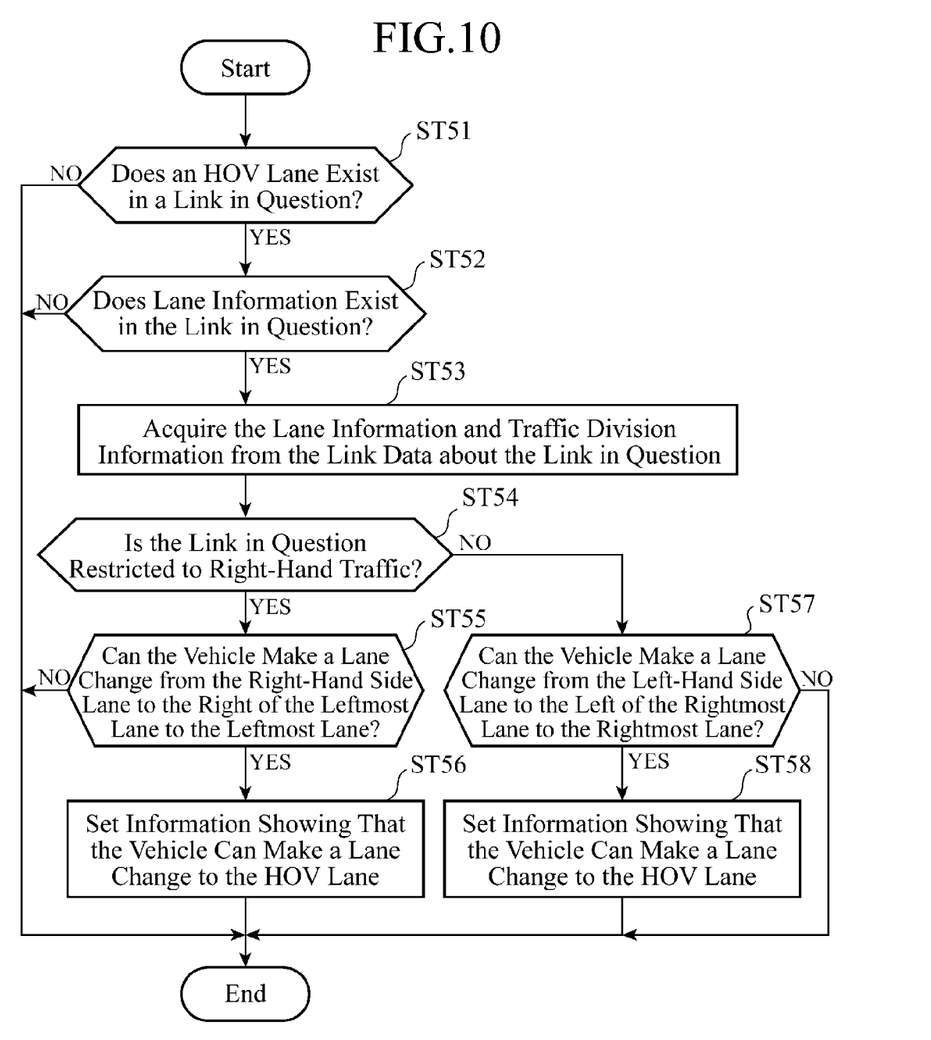
FIG. 10 is a flow chart showing the operation of a navigation device in accordance with Embodiment 2 of the present invention, focusing on an HOV lane entrance/exit section identification process.

Next, the operation of the navigation device in accordance with Embodiment 2 of the present invention constructed as mentioned above will be explained with reference to a flow chart shown in FIG. 10, focusing on an HOV lane entrance/exit section identifying process. In this HOV lane entrance/exit section identifying process, entrance/exit sections of an HOV lane are identified as to an arbitrary link by using a combination of lane information, HOV lane existence or non-existence information, and traffic division information. Hereafter, the HOV lane entrance/exit section identifying process will be explained concretely.

In the HOV lane entrance/exit section identifying process, whether an HOV lane exists in a link in question is checked to see first (step ST51). More specifically, the HOV lane entrance/exit section determining unit 26 refers to the contents of a map data storage unit 5 via the control part 20 and the map data processing unit 21 so as to check to see whether the HOV lane existence or non-existence information included in the link data corresponding to the link in question shows that an HOV lane exists. When, in this step ST51, determining that no HOV lane exists in the link in question, the HOV lane entrance/exit section determining unit recognizes that no HOV lane entrance/exit section exists in the link, and then ends the HOV lane entrance/exit section identifying process.

When it is determined in above-mentioned step ST51 that an HOV lane exists in the link in question, whether lane information exists in the link in question is then checked to see (step ST52). More specifically, the HOV lane entrance/exit section determining unit 26 refers to the contents of the map data storage unit 5 via the control part 20 and the map data processing unit 21 so as to check to see whether lane information exists in the link data corresponding to the link in question. When, in this step ST51, determining that no lane information exists in the link data corresponding to the link in question, the HOV lane entrance/exit section determining unit recognizes that no HOV lane entrance/exit section exists in the link, and then ends the HOV lane entrance/exit section identifying process.

When it is determined in above-mentioned step ST52 that lane information exists in the link in question, the lane information and traffic division information are then acquired from the link data about the link in question (step ST53). More specifically, the map data processing unit 21 acquires map data corresponding to a map to be displayed on the screen of a display unit 6 from the map data storage unit 5. The HOV lane entrance/exit section determining unit 26 then acquires the map data from the map data processing unit 21 via the control part 20, and also acquires the line information and the traffic division information from the link data included in this map data.

Whether or not the link in question is restricted to right-hand traffic is then checked to see (step ST54). More specifically, the HOV lane entrance/exit section determining unit 26 refers to the traffic division information acquired in step ST53 so as to check to see whether or not the traffic division of the link in question is right-hand traffic.

When it is determined in this step ST54 that the link in question is restricted to right-hand traffic, whether the vehicle can make a lane change from the right-hand side lane to the right of the leftmost lane to the leftmost lane is then checked to see (step ST55). More specifically, in the case in which the road is restricted to right-hand traffic, the HOV lane entrance/exit section determining unit 26 assumes that the HOV lane exists in the leftmost end of the road to check to see whether the vehicle can make a lane change from the right-hand side lane to the right of the HOV lane to the HOV lane on the basis of the lane information acquired in step ST53. When, in this step ST55, determining that the vehicle cannot make a lane change from the right-hand side lane to the right of the leftmost lane to the leftmost lane, the HOV lane entrance/exit section determining unit ends the HOV lane entrance/exit section identifying process.

In contrast, when it is determined in step ST55 that the vehicle can make a lane change from the right-hand side lane to the right of the leftmost lane to the leftmost lane, information showing that the vehicle can make a lane change to the HOV lane is set (step ST56). More specifically, the HOV lane entrance/exit section determining unit 26 stores the information showing that the vehicle can make a lane change to the HOV lane of the link in question in the HOV lane entrance/exit section storage unit 27. After that, the HOV lane entrance/exit section determining unit ends the HOV lane entrance/exit section identifying process.

When it is determined in above-mentioned step ST54 that the link in question is not restricted to right-hand traffic, it is recognized that the link in question is restricted to left-hand traffic and whether the vehicle can make a lane change from the left-hand side lane to the left of the rightmost lane to the rightmost lane is then checked to see (step ST57). More specifically, in the case in which the road is restricted to left-hand traffic, the HOV lane entrance/exit section determining unit 26 assumes that the HOV lane exists in the rightmost end of the road to check to see whether the vehicle can make a lane change from the left-hand side lane to the left of the HOV lane to the HOV lane on the basis of the lane information acquired in step ST53. When, in this step ST57, determining that the vehicle cannot make a lane change from the left-hand side lane to the left of the rightmost lane to the rightmost lane, the HOV lane entrance/exit section determining unit ends the HOV lane entrance/exit section identifying process.

In contrast, when it is determined in step ST57 that the vehicle can make a lane change from the left-hand side lane to the left of the rightmost lane to the rightmost lane, information showing that the vehicle can make a lane change to the HOV lane is set (step ST58). More specifically, the HOV lane entrance/exit section determining unit 26 stores the information showing that the vehicle can make a lane change to the HOV lane of the link in question in the HOV lane entrance/ exit section storage unit 27. After that, the HOV lane entrance/exit section determining unit ends the HOV lane entrance/exit section identifying process.

Figure 11:
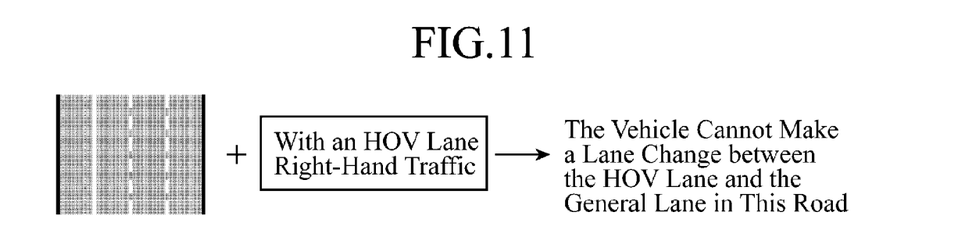
FIG. 11 is a view for explaining the operation of the navigation device in accordance with Embodiment 2 of the present invention.

Through the above-mentioned HOV lane entrance/exit section identifying process, when the HOV lane existence or non-existence information shows that an HOV lane exists, the traffic division information shows that the link is restricted to right-hand traffic, and the lane information shows that "the lane line between the leftmost lane and the right-hand side lane (a general lane) to the right of the leftmost lane is a continuous yellow line", as shown in, for example, FIG. 11, it is determined that the vehicle cannot make a lane change between the leftmost lane and the right-hand side lane.

The route searching process, the lane change guidance process, and the map display process are the same as them of the navigation device in accordance with above-mentioned Embodiment 1.

As explained above, the navigation device in accordance with Embodiment 2 of the present invention provides the same advantages as those provided by the navigation device in accordance with above-mentioned Embodiment 1.

The navigation device in accordance with any one of above-mentioned Embodiments 1 and 2 is configured in such away as to, when needing information about HOV lane entrance/exit sections in the route search or route guidance, determine HOV lane entrance/exit sections. As an alternative, the navigation device can be configured in such a way that the HOV lane entrance/exit section determining unit 26 determines HOV lane entrance/exit sections in advance and stores information showing them in the map data storage unit 5, and, when needing the information showing the HOV lane entrance/exit sections, acquires the information from the map data storage unit 5 via the map data processing unit 21 and uses the information. This configuration makes it possible to reduce the load on the CPU 11 and the amount of usage of the RAM 13.

INDUSTRIAL APPLICABILITY

As mentioned above, in order to be able to identify each entrance/exit section of an HOV lane even in a case in which both the HOV lane and a general lane are included in one link, the navigation device in accordance with the present invention is configured in such a way as to include: the map data processing unit for acquiring map data from the map data storage unit; the HOV lane entrance/exit section determining unit for, when HOV lane position information defining the position of an HOV lane and lane information defining lanes are included in link data included in the map data acquired by the map data processing unit, determining whether or not the vehicle can make a lane change between the HOV lane and either a right-hand side lane to the right of the HOV lane shown by the HOV lane position information or a left-hand side lane to the left of the HOV lane on the basis of the lane information, and determining that there is an HOV lane entrance/exit section when determining that the vehicle can make a lane change between the HOV lane and either the right-hand side lane or the left-hand side lane; and the HOV lane entrance/exit section storage unit for storing HOV lane entrance/exit section information showing the HOV lane entrance/exit section determined by the HOV lane entrance/exit section determining unit. Therefore, the navigation device is suitable for use as a navigation device that guides the user to his or her destination along a highway having car pool lanes.

The invention claimed is:

1. A navigation device comprising:
a map data processing unit for acquiring map data from a map data storage unit;
a high occupancy vehicle (HOV) lane entrance/exit section determining unit for, when HOV lane position information defining a position of an HOV lane and lane information defining lanes are included in link data included in the map data acquired by said map data processing unit, determining whether or not a vehicle can make a lane change between the HOV lane and either a right-hand side lane to right of the HOV lane shown by said HOV lane position information or a left-hand side lane to left of the HOV lane on a basis of said lane information, and determining that there is an HOV lane entrance/exit section when determining that the vehicle can make a lane change between the HOV lane and either the right-hand side lane or the left-hand side lane; and
an HOV lane entrance/exit section storage unit for storing HOV lane entrance/exit section information showing the HOV lane entrance/exit section determined by said HOV lane entrance/exit section determining unit.

2. The navigation device according to claim 1, wherein said navigation device includes:
an HOV lane entrance/exit extracting unit for extracting an HOV lane entrance/exit section on a basis of the HOV lane entrance/exit section information acquired from said HOV lane entrance/exit section storage unit so as to create entrance/exit section position data showing a position of said extracted HOV lane entrance/exit section; and
a map display processing unit for displaying a map in which an HOV lane existing at the position shown by the entrance/exit section position data created by said HOV lane entrance/exit extracting unit is highlighted.

3. The navigation device according to claim 1, wherein said navigation device includes:
a route searching unit for searching for a route leading from a place of departure to a destination on a basis of the map data acquired by the map data processing unit, and the HOV lane entrance/exit section information acquired from the HOV lane entrance/exit section storage unit;
a route guidance unit for carrying out route guidance by using the HOV lane entrance/exit section information acquired from said HOV lane entrance/exit section storage unit according to the route which is searched for by said route searching unit.

4. A map data processing method comprising:
when high occupancy vehicle (HOV) lane position information defining a position of an HOV lane and lane information defining lanes are included in link data included in the map data, determining whether or not a vehicle can make a lane change between the HOV lane and either a right-hand side lane to right of the HOV lane shown by said HOV lane position information or a left-hand side lane to left of the HOV lane on a basis of said lane information, and determining that there is an HOV lane entrance/exit section when determining that the vehicle can make a lane change between the HOV lane and either the right-hand side lane or the left-hand side lane; and
storing HOV lane entrance/exit section information showing the HOV lane entrance/exit section.

5. A navigation device comprising:
a map data processing unit for acquiring map data from a map data storage unit;

a high occupancy vehicle (HOV) lane entrance/exit section determining unit for, when HOV lane existence or non-existence information defining existence or non-existence of an HOV lane, traffic division information defining a traffic division and lane information defining lanes are included in link data included in the map data acquired by said map data processing unit, determining whether or not a vehicle can make a lane change between a leftmost lane and a lane to right of the leftmost lane on a basis of said lane information if said HOV lane existence or non-existence information defines that an HOV lane exists and said traffic partition information defines that the link is restricted to right-hand traffic, or determining whether or not the vehicle can make a lane change between a rightmost lane and a lane located to left of the rightmost lane on a basis of said lane information if said HOV lane existence or non-existence information defines that an HOV lane exists and said traffic partition information defines that the link is restricted to left-hand traffic, and for determining that there is an HOV lane entrance/exit section when determining that the vehicle can make a lane change between the leftmost or rightmost lane and a lane located to the right or left of the leftmost or rightmost lane; and an HOV lane entrance/exit section storage unit for storing HOV lane entrance/exit section information showing the HOV lane entrance/exit section determined by said HOV lane entrance/exit section determining unit.

6. The navigation device according to claim 5, wherein said navigation device includes:

an HOV lane entrance/exit extracting unit for extracting an HOV lane entrance/exit section on a basis of the HOV lane entrance/exit section information acquired from said HOV lane entrance/exit section storage unit so as to create entrance/exit section position data showing a position of said extracted HOV lane entrance/exit section; and a map display processing unit for displaying a map in which an HOV lane existing at the position shown by the entrance/exit section position data created by said HOV lane entrance/exit extracting unit is highlighted.

7. The navigation device according to claim 5, wherein said navigation device includes:

a route searching unit for searching for a route leading from a place of departure to a destination on a basis of the map data acquired by the map data processing unit, and the HOV lane entrance/exit section information acquired from the HOV lane entrance/exit section storage unit;

a route guidance unit for carrying out route guidance by using the HOV lane entrance/exit section information acquired from said HOV lane entrance/exit section storage unit according to the route which is searched for by said route searching unit.

8. A map data processing method comprising:

when high occupancy vehicle (HOV) lane existence or non-existence information defining existence or non-existence of an HOV lane, traffic division information defining a traffic division and lane information defining lanes are included in link data included in a map data, determining whether or not a vehicle can make a lane change between a leftmost lane and a lane to right of the leftmost lane on a basis of said lane information if said HOV lane existence or non-existence information defines that an HOV lane exists and said traffic partition information defines that the link is restricted to right-hand traffic, or determining whether or not the vehicle can make a lane change between a rightmost lane and a lane located to left of the rightmost lane on a basis of said lane information if said HOV lane existence or non-existence information defines that an HOV lane exists and said traffic partition information defines that the link is restricted to left-hand traffic, and determining that there is an HOV lane entrance/exit section when determining that the vehicle can make a lane change between the leftmost or rightmost lane and a lane located to the right or left of the leftmost or rightmost lane; and storing HOV lane entrance/exit section information showing the HOV lane entrance/exit section.

9. The map data processing method according to claim 8, further comprising:

extracting an HOV lane entrance/exit section on a basis of the HOV lane entrance/exit section information acquired from said step of storing HOV lane entrance/exit section information so as to create entrance/exit section position data showing a position of said extracted HOV lane entrance/exit section; and displaying a map in which an HOV lane existing at the position shown by the entrance/exit section position data created by said extracting step is highlighted.

10. The map data processing method according to claim 8, further comprising:

searching for a route leading from a place of departure to a destination on a basis of the acquired map data, and the HOV lane entrance/exit section information acquired from said step of storing HOV lane entrance/exit section information;

carrying out route guidance by using the HOV lane entrance/exit section information acquired from said step of storing HOV lane entrance/exit section information according to the route which is searched for by said searching step.

* * * * *